United States Patent [19]

Larson et al.

[11] Patent Number: 5,582,743
[45] Date of Patent: Dec. 10, 1996

[54] COMPOSITE LIQUID FILTER

[75] Inventors: Douglas A. Larson, River Forest; Thomas J. Danowski; William L. Jacoby, Jr., both of Elgin, all of Ill.

[73] Assignee: Safety-Kleen Corp., Elgin, Ill.

[21] Appl. No.: 476,783

[22] Filed: Jun. 7, 1995

Related U.S. Application Data

[62] Division of Ser. No. 220,190, Mar. 30, 1994, Pat. No. 5,478,465.

[51] Int. Cl.$^6$ .................. B01D 27/07; B01D 29/25; B08B 3/04
[52] U.S. Cl. .................. 210/804; 210/805; 210/806; 134/10
[58] Field of Search .................. 210/767, 790, 210/799, 804, 806, 167, 172, 257.1, 323.2, 336, 433.1, 443, 484, 805; 134/10, 111

[56] References Cited

U.S. PATENT DOCUMENTS

| | | |
|---|---|---|
| 2,334,791 | 11/1943 | Roffy. |
| 2,809,753 | 10/1957 | Atkinson. |
| 3,560,377 | 2/1971 | Loeffler. |
| 3,794,179 | 2/1974 | Doucet .................. 210/409 |
| 3,929,648 | 12/1975 | Cuthbert. |
| 4,039,448 | 8/1977 | Etani .................. 210/323.2 |
| 4,056,114 | 11/1977 | Boutillette .................. 210/167 |
| 4,128,478 | 12/1978 | Metzger. |
| 4,372,859 | 2/1983 | Sugimoto et al. .................. 210/790 |
| 4,379,052 | 4/1983 | Stearns .................. 210/790 |
| 4,462,415 | 7/1984 | Otzen .................. 134/111 |
| 4,495,072 | 1/1985 | Fields .................. 210/238 |
| 4,786,420 | 11/1988 | Dalessandro. |
| 4,820,426 | 4/1989 | Pfertzel et al. .................. 210/790 |
| 4,906,381 | 3/1990 | Barbaro. |
| 5,071,567 | 12/1991 | Corcelle et al. .................. 210/744 |
| 5,205,938 | 4/1993 | Flumano et al. .................. 210/484 |
| 5,342,519 | 8/1994 | Friedmann et al.. |

*Primary Examiner*—Peter A. Hruskoci
*Assistant Examiner*—Theodore M. Green
*Attorney, Agent, or Firm*—James T. FitzGibbon; Angelo J. Bufalino

[57] ABSTRACT

A liquid filter apparatus particularly useful in removing particulates from parts washing solvent. A filter assembly includes an exterior, fluid, impermeable container, preferably in the form of a flexible sidewall bag, and an interior filter element with permeable sidewalls and inlet and outlet ends, preferably in the form of a sleeve. In use, liquid entering the sleeve may pass unfiltered entirely through the sleeve and exit through a sidewall of the exterior container, or all or any part of such liquid may pass through the filter sleeve and into a portion of the apparatus outside the sleeve but inside the exterior container. From this portion, the liquid emerges in a filtered condition. Consequently, the filter continually operates in both filtration and bypass modes. Preferably the flexible sidewall container is received within a rigid support housing, two filter units are provided, and their inlets and outlets are removably secured to a manifold controlling passage of fluid to be cleaned from a liquid pump assembly and to another part of a parts washer associated with the filter.

6 Claims, 8 Drawing Sheets

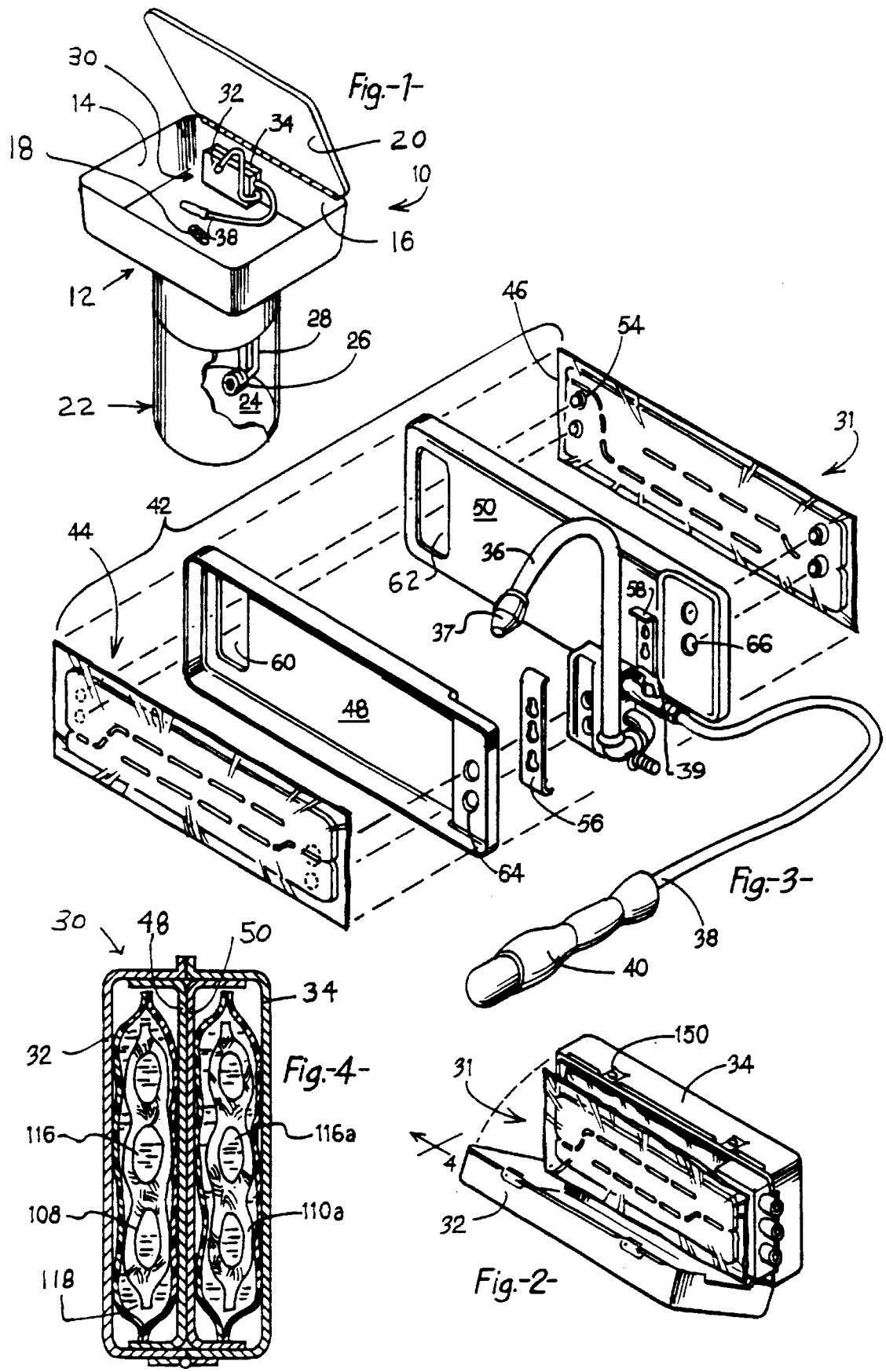

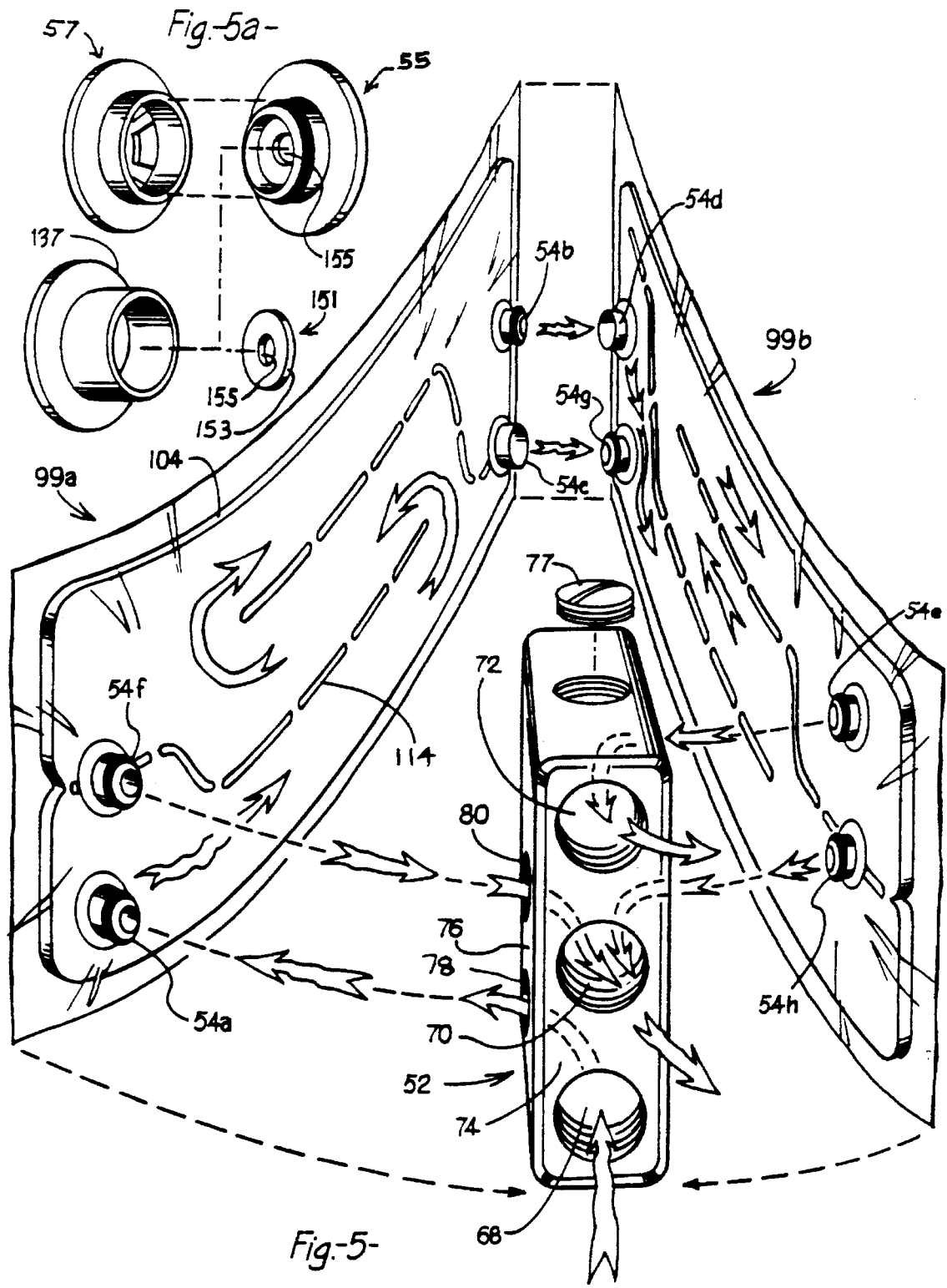

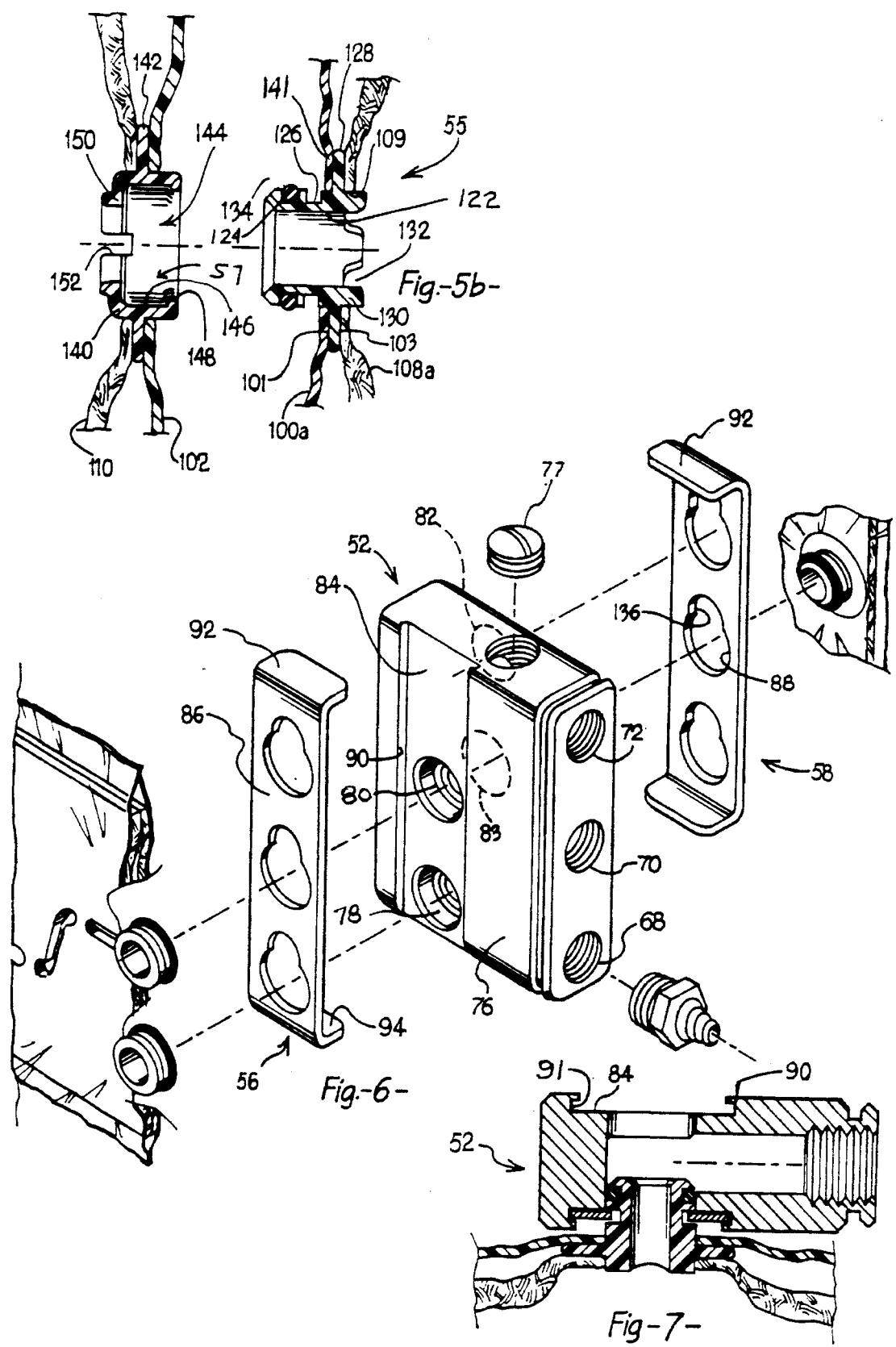

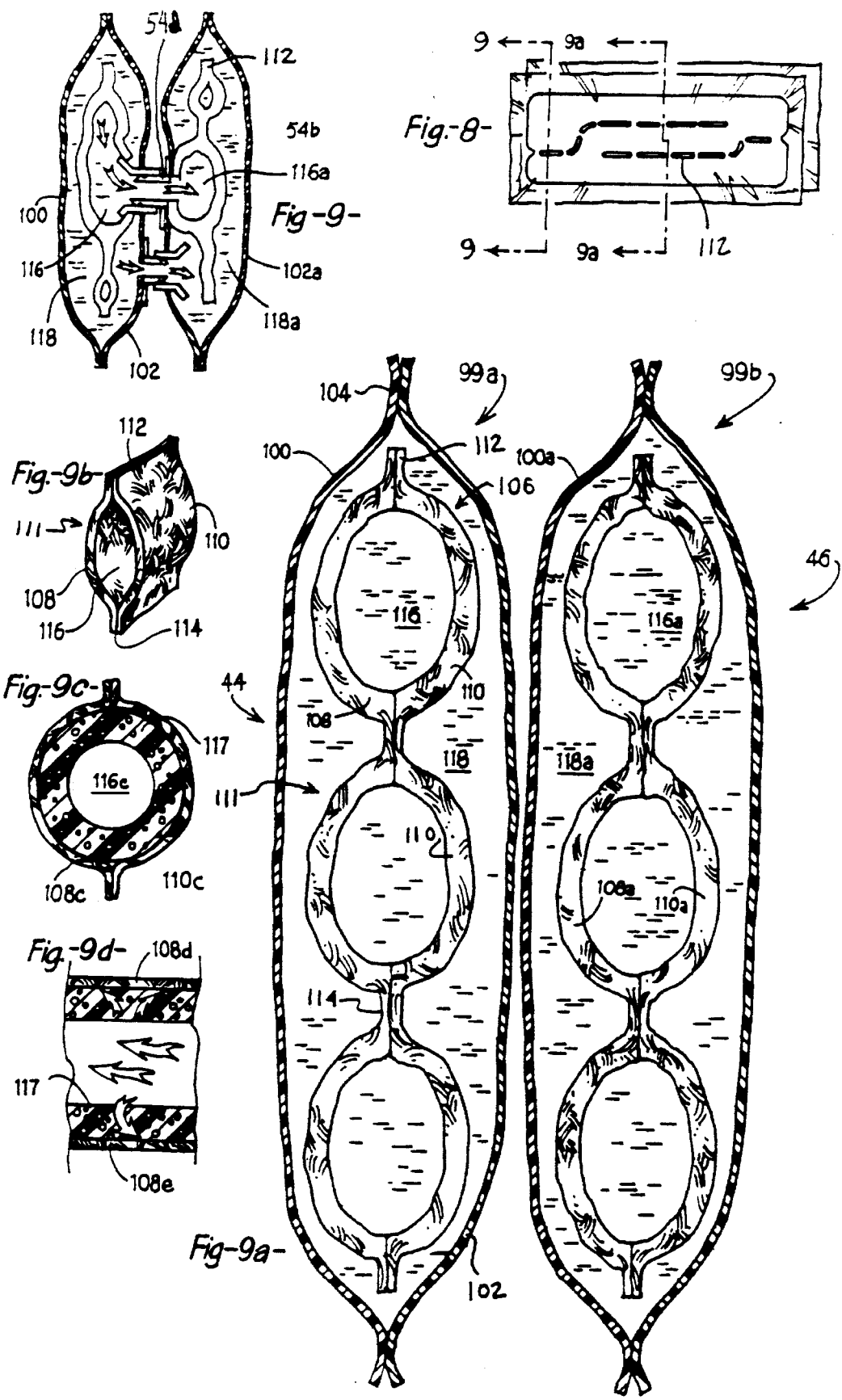

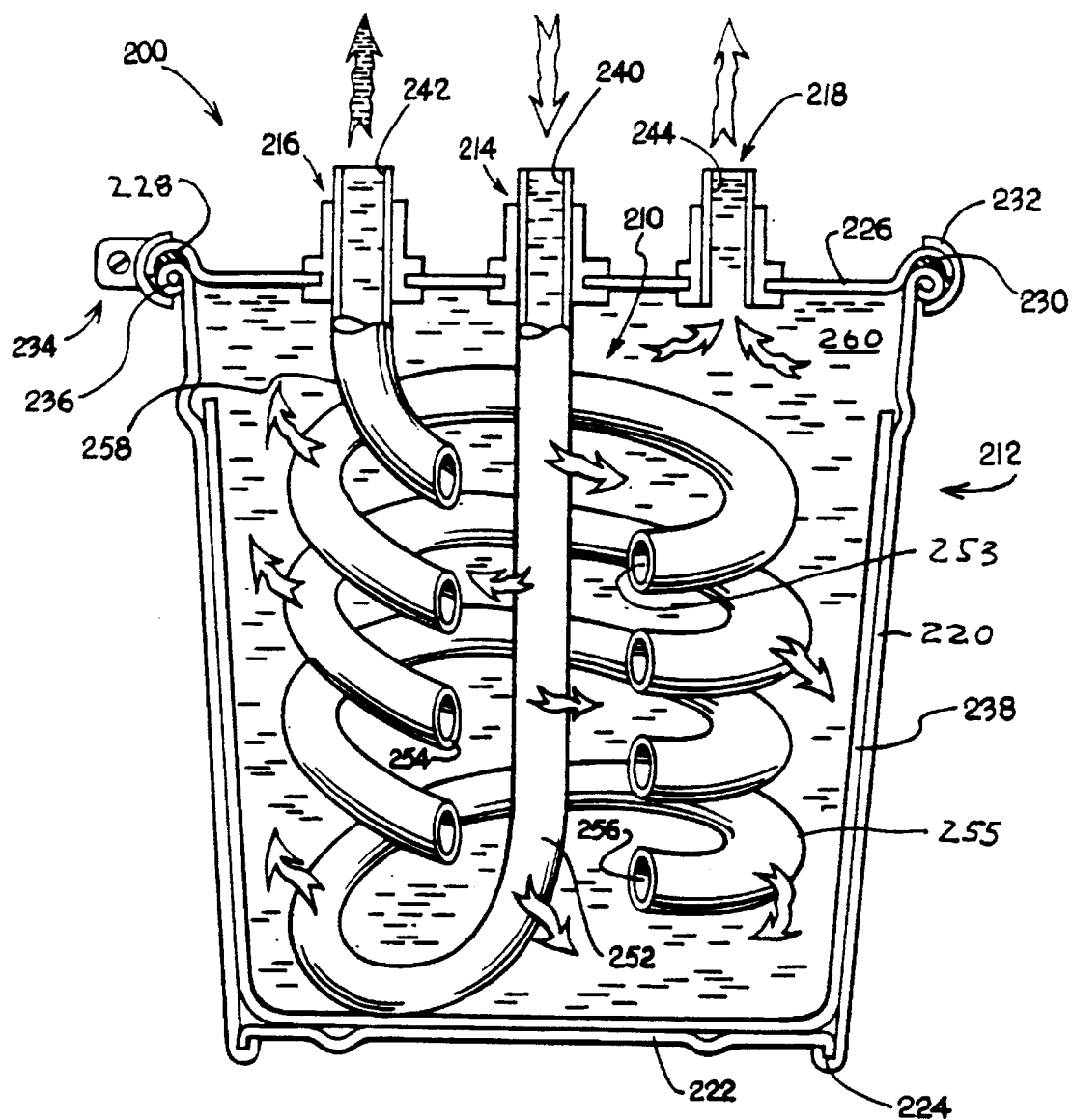
Fig.-10-

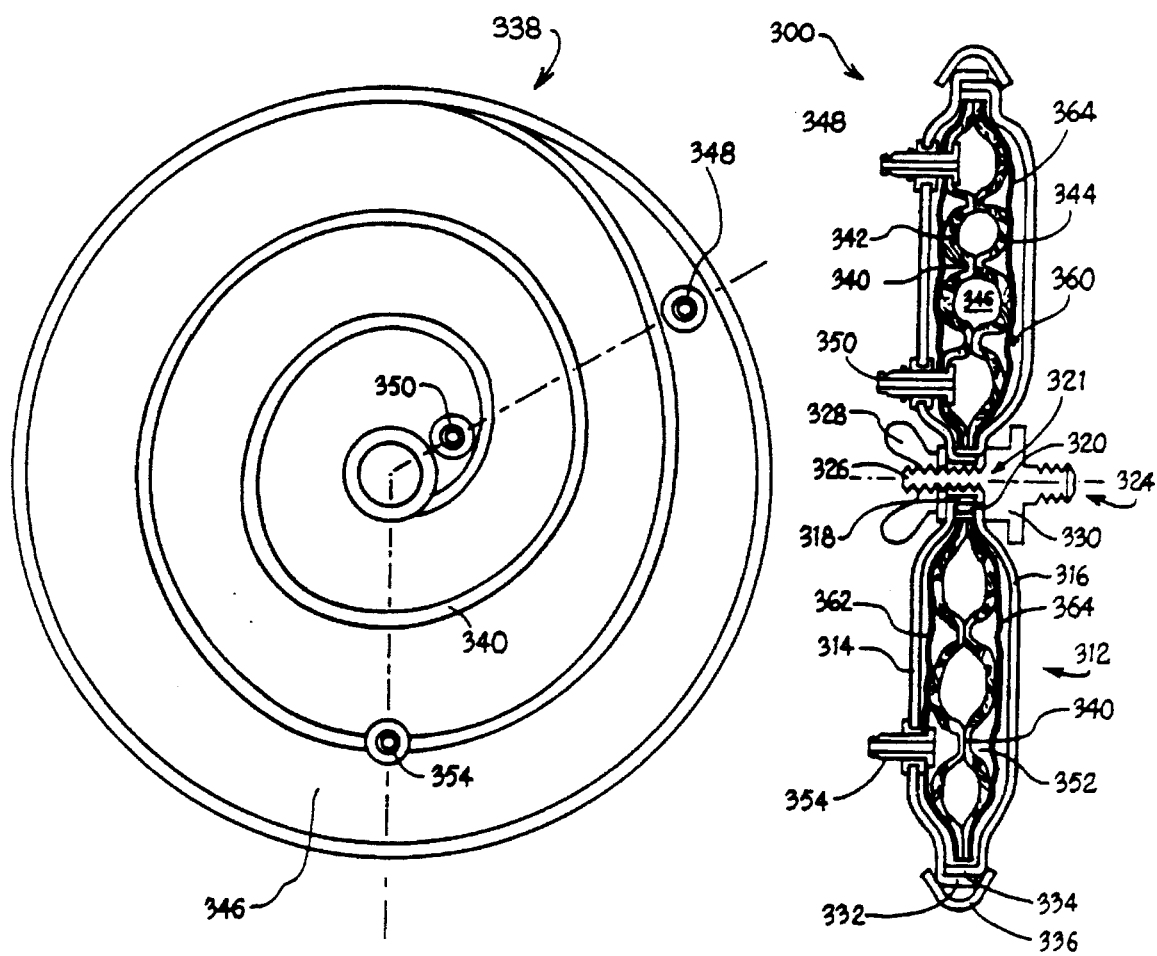
Fig-12-
Fig-11-

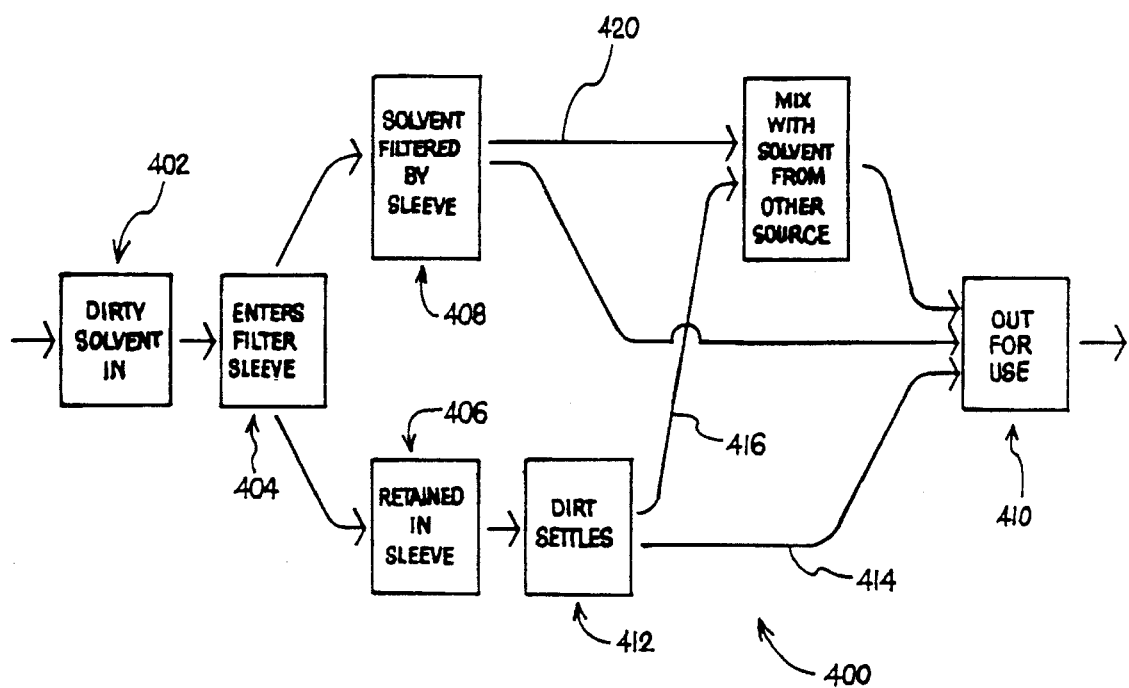
Fig.-13-

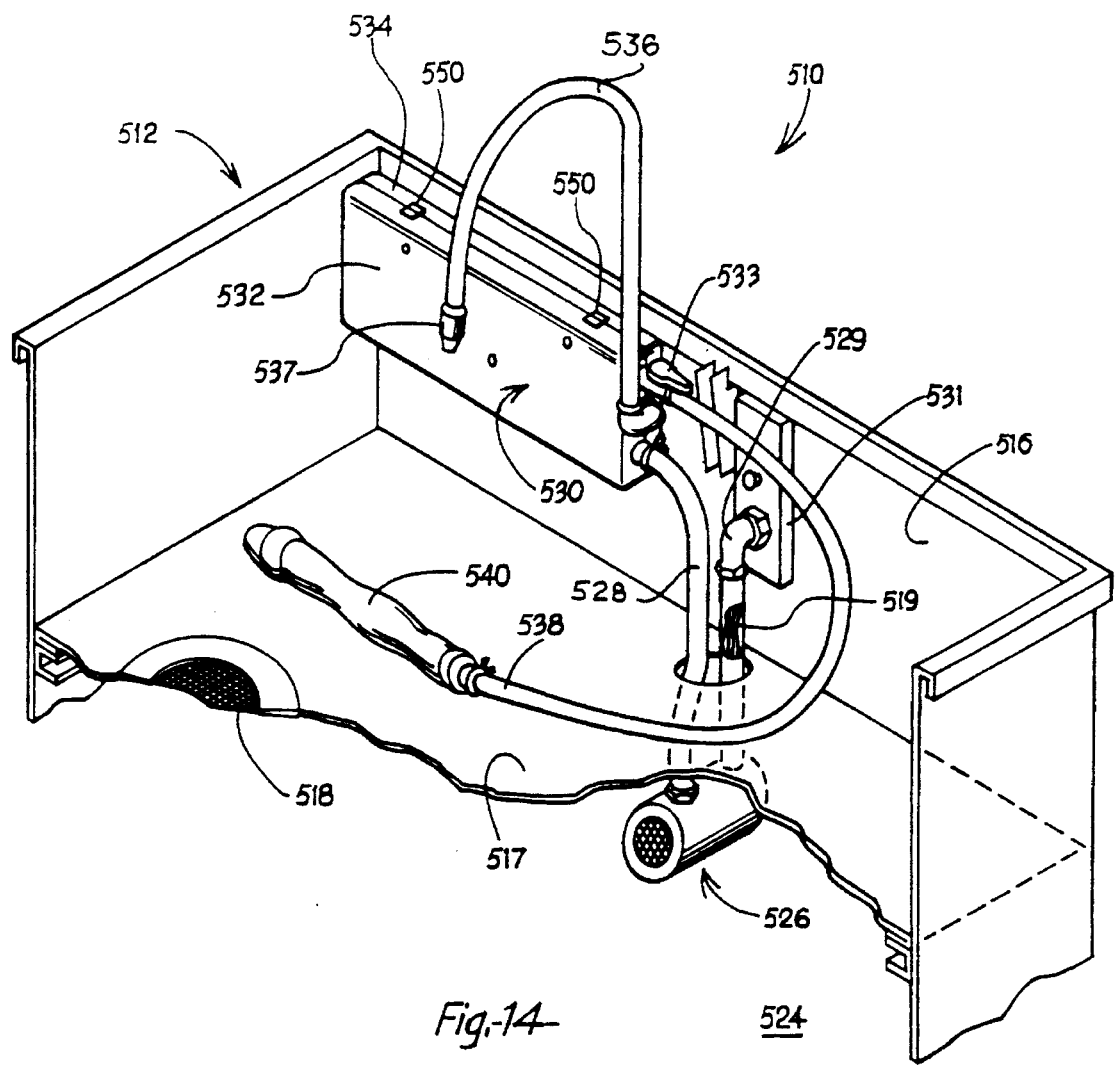
Fig.-14-

COMPOSITE LIQUID FILTER

This application is a divisional of application Ser. No. 08/220,190, filed Mar. 30, 1994 U.S. Pat. No. 5,478,465.

BACKGROUND OF THE INVENTION

The present invention relates generally to filters for liquids, and more particularly, to the construction of a liquid flow filter wherein, by reason of the construction and arrangement of its components, the filter will not clog or become blocked during operation. By way of background, a principal advantage for a filter made according to the principles of the present invention is that two distinct liquid flow paths are provided, and three separate mechanisms are at work during operation of the filter.

One principal application of the filter of the invention is that of cleaning solvent used in washing mechanical parts, particularly auto, truck, and like mechanical parts that have become oily, greasy or otherwise require cleaning before reinstallation, rebuilding, or repair of the parts or a mechanism of which they form a component.

In many cases, cleaning solvent for mechanical parts is retained in the sump or reservoir of a large square tank or cylinder drum and circulated by means of a pump from the sump of the tank or drum to a cleaning area, often a sink or the like, and then allowed to flow by gravity back into the receptacle. As the solvent picks up the dirt from the work being cleaned, it entrains particulate matter and becomes dirty and discolored rather quickly. While a certain amount and kind of contaminants will inherently be separated from the body of the solvent in the reservoir merely by settling or sedimentation, because of the agitation caused by the circulation itself, or the pump action, and because of the relatively small particle size of such contaminants, it is quite common for the solvent being used in such a cleaning operation to require frequent changing.

In the past, attempts to filter such solvent for cleaning purposes have had two or more principal drawbacks. One typical drawback with such an arrangement is that when filter comprises simply a screen, or a loose mass of absorptive material, such material is not effective to separately dispersed, fine contaminants. Such a filter may act to remove coarse materials, but is not particularly effective against relatively fine contaminants.

To the extent that such filters are made from a finer mesh or less porous material, such as utilizing a paper cone or other type construction, the filters, after a relatively brief time, have their working surfaces coated with a layer of the contaminants. This impedes rapid flow through the filter, effectively slowing or reducing the treatment rate to an undesirable level. Moreover, retaining a significant volume of fluid in a location above the unit center of gravity can create at least a slight safety hazard. Accordingly, most parts washers have typically used relatively course or crude filter arrangements.

In other instances, attempts have been made to secure good filtration action by using a relatively fine mesh filter. Examples of this approach include using automotive type oil filters or the like that are themselves capable of removing relatively fine contaminants. However, filters of this kind typically have two inherently associated drawbacks.

First, such filters often require a relatively strong force to cause fluid flow; this is attributable to their fine mesh size. While such characteristic is satisfactory in an automotive lubrication application, for example, where the oil circulation system is powerful, this is not a consideration with a parts washer which uses a small, fractional horsepower motor and which requires most or all of the pumping effort merely to circulate the solvent to a height of several feet above liquid level. In such instances, there is no ready reserve of power available to supply the motive force necessary to force the liquid through the filter at a satisfactory rate.

Another aspect of any fine mesh filter, including automotive filters, that are capable of filtering out small particles, is that they can become clogged, i.e., they become impermeable when the interstices in the filter are filled with entrapped contaminants. In most instances, a bypass mode is provided for this contingency. However, this requires the maintenance of a significant forward pressure level, i.e., a measurable force is required to unseat a check valve or the like. If this is not the case, then the filter would operate exclusively in the bypass mode and not be effective. Hence, such bypass arrangements have traditionally been associated only with filters used in higher pressure systems.

Referring now to problems peculiar to the parts washer industry, in many instances, it is desired, for reasons of legal and regulatory compliance, to provide an established, properly permitted company to service solvent-containing parts washers. In some instances, the servicing agency is the owner of the machine, and more or less regular service intervals may be honored. However, in the case of a customer owning a parts washer, problems have traditionally arisen. First, it is desirable that it be made clear to the customer in a clear and straightforward way when a change of solvent is indicated.

Thus, although changing solvent on a regular schedule has some advantages. Some customers feel it is wasteful to change solvent too often, but they realize that failure to change soon enough degrades solvent performance and creates a number of risks. Consequently, they often desire to wait until the solvent is dirty and then call in for a change of solvent. This may take some time, and users do not wish to risk failure in the time between calling for service and the time the service is performed.

Because of the presence of the aforesaid regulations and the like, it is therefore not uncommon for customers to fail to change solvents with the regularity that should be required. Attempts by users to change their own filters or replace solvents themselves often run afoul of regulatory requirements.

Accordingly, it would be considered very advantageous if there were available a solvent filter system which would greatly simplify service of parts washers in the field.

It would likewise be very advantageous for a number of parts washer users if there were readily available a parts washer filter unit that would continue to deliver substantially unimpeded flow of solvent, even after the effective service life of the filter had diminished almost completely.

It would also be considered very advantageous if there were available a solvent filter for a parts washer wherein observing the solvent could be made to provide an accurate indication of the amount of residual contaminants in the solvent and wherein the parts washer operation could be continued to and beyond a normal end point without significant damage without significantly compromising the solvent flow rate.

In view of the foregoing circumstances, including the failure of the prior art to provide an improved, highly advantageous filter system for a parts washer, it is an object of the present invention to provide an improved liquid filter unit.

Another object of the invention is to provide a solvent filter that is capable of continuing to supply solvent to a parts washer outlet at a substantial flow rate, regardless of the extent to which the filter removing the contaminants has accumulated contaminating material.

Still another object of the invention is to provide an improved modular solvent filter assembly for parts washers or other uses wherein the filter assembly is designed for ready insertion into and removal from an exterior protective housing.

A further object of the invention is to provide a filter arrangement including an exterior, liquid-tight bag, receptacle or container within which is disposed a sleeve made from porous material and arranged in a labyrinth within the housing, and wherein the sleeve has an inlet, and both the sleeve and the receptacle have outlets for the liquid passing through the filter.

A still further object of the invention is to provide a filter assembly that includes a porous filter element constructed and arranged so as to provide inlet and outlet openings, and having permeable sidewalls, with such filter element being disposed inside a pouch or bag type receptacle that is impermeable to fluid, and wherein, in use, liquid passes into and out of the filter element interior, and also through the walls of the element, and wherein fluid thereafter flows from both the filter interior element outlet opening and the bag interior as well.

Yet another object of the invention is to provide a filter assembly having two interior spaces, one space being an inner space lying within a non-woven fabric or like filter element and the other space lying outside filter the element but within an exterior receptacle, preferably having flexible walls, with passages being provided so as to permit fluid to flow both into and out of the inner space and also outwardly of the unit as a whole from the outer space between the filter element and the exterior container.

A further object is to provide a filter which is substantially non-clogging in use and that inherently provides a substantially continuous bypass mode of operation.

Another object of the invention is to provide a filter assembly having an exterior, liquid-impermeable outer container that may be rigid or flexible, and wherein a sleevelike filter element of great length relative to its cross-section is contained inside this outer container to provide both an inner space for unfiltered liquid and an outer space for liquid that has been filtered but remains inside the outer container.

Yet another object of the invention is to provide a filter assembly which may be economically manufactured and which may be used as a unit or may be used in modular form in conjunction with one or more additional, substantially similar units to achieve longer life in use or increased filter capacity.

A further object of the invention is to provide a filter unit wherein the filter element, preferably in sleeve or tube form, is made from a permeable fabric, such as from fine non-woven plastic fibers or like material with the sleeve or tube having open inlet and outlet ends spaced well apart from each other, and arranged so that the long tube thus formed provides a large, active filter area and has a substantial interior volume.

A still further object of the invention is to provide a filter assembly having an inner filter element made from a porous, fine mesh material in tube, sleeve or like form and disposed within a liquid-impermeable outer container having flexible sidewalls, with the elements being arranged so that, when the pump is turned off, the expanding forces on the flexible outer sidewalls will be relaxed, and the walls will contract and cause filtered fluid to flow back into the area inside the filter element so as to create a backwashing or self-cleaning action within the filter assembly.

Another object of the invention is to provide a filter arrangement wherein one or more novel filter elements are used in connection with an exterior protective cabinet and a manifold or like flow-directing arrangement whereby a single stream of solvent or like liquid may be directed from an inlet to and through various passages and emerge as a single stream or as separate streams for use at the point of application.

A further object of the invention is to provide a novel filter assembly which is particularly useful in parts washing apparatus and the like.

A still further object of the invention is to provide a filter assembly having a mechanism that is particularly effective when operated at comparatively low flow rates and under minimal pressures.

Another object of the invention is to provide a filter assembly which inherently provides both filtration and bypass modes, and wherein the proportion of fluid that is filtered to that which is unfiltered is largely or completely self-regulating in use.

Yet another object of the invention is to provide a non-clogging filter which may be arranged to provide a visible warning of its filtration effectiveness.

A further object of the invention is to provide a filter that is able to be manufactured at low cost and will be highly reliable in use.

A still further object of the invention is to provide a method of filtering liquids which includes passing a part of such liquid through a filter element and permitting the remainder of the filter to entrap contaminants on the filter walls or to separate from the fluid by sedimentation, whereby the remainder of the liquid will emerge in a cleaned but unfiltered condition.

Yet another object of the invention is to provide a method of filtering liquids which includes passing a portion of the liquid to be treated through a filter element and permitting the remainder to flow unfiltered throughout an extended length within a space on the interior of the element, and utilizing both outlet streams in a cleaning, lubricating, or cooling process.

An additional object of the invention is to provide a method of liquid filtration which is operable at low flow rates and at extremely low pressures.

Another object of the invention is to provide a filter assembly wherein the filtration effectiveness and service life of the unit may be determined readily and comparatively accurately by visual observation.

A further object is to provide a filter element which includes a shape-imparting element, such as a tube or pipe from a sponge or foam-like material, covered on its exterior with a fine mesh, non-woven fabric material.

A still further object is to provide a filter element made from opposed sheets of a non-woven fabric material, heat sealed together along a selected seaming path to provide a labyrinth or similar shape having a high length to cross-section ratio.

Yet another object is to provide a filter element as set forth above, used in combination with an exterior, flexible-walled receptacle that includes inlets and outlets sufficient to provide both bypass and filtration modes in use.

A further object of the invention is to provide a filter assembly whose operational mechanism renders it compatible with either rigid or flexible filter elements, and with either rigid and flexible exterior containers.

The foregoing and other objects and advantages of the invention are achieved in practice by providing a filter assembly having an exterior, fluid-impermeable container receptacle with at least one outlet opening, a filter element made from a porous material and having an interior passage space extending between inlet and outlet openings and being disposed inside the exterior receptacle so as to create an exterior space between the container and the filter, whereby unfiltered liquid passes through the inlet and into and through the interior passage and to the filter element outlet, and wherein liquid also passes from the inlet, through the walls of the filter element and into the outer space, and thereafter through the receptacle outlet to the point of use. Preferably, the filter assembly includes fittings adapted to direct the fluid into and out of the respective inner and outer spaces provided by the filter element and the exterior container, and to simplify attachment and replacement of the filter assembly. The invention provides construction features making it easy to arrange the filter assemblies in pairs or other multiples, and a method of cleaning solvent.

The exact manner in which the foregoing and other objects and advantages of the invention are achieved in practice will become more clearly apparent when reference is made to the following detailed description of the preferred embodiments of the inventions set forth by way of example and shown in the accompanying drawings, wherein like reference numbers indicate corresponding parts throughout.

BRIEF DESCRIPTION OF THE DRAWINGS

FIG. 1 is a perspective view, with a portion broken away, showing one type of parts washer with which the filter of the invention is able to be used;

FIG. 2 is a somewhat enlarged perspective view showing an operable rigid exterior housing for a pair of replaceable filter assemblies made according to the invention;

FIG. 3 is an enlarged, exploded view showing a matched pair of filter assemblies, two protective shells, a fluid flow manifold, and other elements of the invention;

FIG. 4 is a vertical sectional view, on a further enlarged scale, taken along lines 4—4 of FIG. 2 and showing certain components of the filter assembly in an assembled form within their housing;

FIG. 5 is a perspective view, partly diagrammatic in character, showing the arrangement of a pair of filter assemblies relative to each other and to an associated fluid flow manifold;

FIG. 5a is a perspective view, partly diagrammatic in character, and showing a pair of cooperating fittings for attaching filter assemblies to each other and to the manifold, and also showing a cap unit for one of the filter assembly fittings;

FIG. 5b is a vertical sectional view of the fittings of FIG. 5a, showing them associated with a filter bag;

FIG. 6 is an enlarged perspective, exploded view showing components of the fluid flow manifold with its locking clips and certain parts of the fittings on the filter assemblies;

FIG. 7 is an enlarged horizontal, sectional view of a portion of the liquid flow manifold showing one of the fittings on the filter assembly secured therein and retained in position of use by a locking clip;

FIG. 8 is a perspective view showing the exterior of a pair of the filter assemblies of the invention, taken from one side of one assembly;

FIG. 9 is an enlarged vertical sectional view, taken along lines 9—9 of FIG. 8 and showing flow patterns within the two filter assemblies, and also showing their attachment fittings in operative relation to each other in one normal position of use;

FIG. 9a is a further enlarged vertical sectional view, taken along 9a—9a of FIG. 8 and showing another portion of the filter assemblies in an operative position of use, as well as their mode of operation;

FIGS. 9b and 9c are schematic views of various forms of materials used in making the filter assemblies of the invention;

FIG. 9d is a vertical sectional view of the material of FIG. 9c;

FIG. 10 is a vertical sectional view, with portions broken away, and partly diagrammatic in nature, showing another embodiment of the filter unit of the invention;

FIG. 11 is a vertical sectional view of an alternate form of filter assembly embodying the invention;

FIG. 12 is a top plan view of the filter element forming a part of the assembly of FIG. 11;

FIG. 13 is a block diagram, schematically showing different mechanisms by which the filter assembly of the invention may operate in use; and FIG. 14 is a perspective view of a modified form of parts washer with which the filter assembly of the invention may be used.

DESCRIPTION OF THE PREFERRED EMBODIMENTS OF THE INVENTION

Preferably, according to the invention, a product embodying the invention will include an exterior, fluid-impermeable receptacle or container, preferably in bag or pouch form, a filter element made from a porous but fine mesh material such as a non-woven fabric and constructed and arranged in sleeve or like form with an inlet opening, an outlet opening and an elongated interior passage defined by permeable walls made from the filter element material. The filter element itself is disposed inside the exterior container so as to divide the container into an outer space for filtered liquid, and an inner space or passage through which unfiltered liquid passes and an outer space for filtered liquid, with the filter assembly also including outer bag openings sufficient to permit flow into the inner fluid flow space or passage as well as out of both inner and outer spaces to a point of use or further treatment.

Preferably, snap-together type fittings are provided to achieve ease of filter installation and change, and it is also preferred that the walls of the filter material be arranged in sleeve or like form such that the inner liquid flow path is very long in relation to the cross-section of the inlet and outlet passages, providing a large filter surface area and an opportunity for particle settling.

One advantage of the invention is that the outputs from the two sources may, but need not be combined, and another advantage is that two or more of the composite filter assemblies may be operated in series or parallel with each other. Moreover, the fluid output may be directed in such a way as to be used after passing through one unit or may be caused to flow through one or more additional units The exact configuration of the porous member forming the filter element is preferably one with a long length-to-diameter or length-to-width ratio, but the element may be formed in a number of ways and maybe constructed in different shapes. Several advantages derive from making the exterior container from a flexible material such as a plastic bag, although such flexible exterior is not necessary to the practice of the invention.

Because of the variety of materials, sizes, shapes, and arrangements of the various components within the inventive concept, a description of several preferred embodiments or variations of the invention will be given.

Referring now to the drawings in greater detail, FIG. 1 shows a parts washer generally designated 10 and shown to include a sink unit generally designated 12 having a sink interior 14 including a sink rear wall 16, a center drain 18, and a safety cover 20. The sink unit 12 is positioned above and in registry with the open mouth of a solvent drum 22, the interior 24 of which receives a submersible pump 26 having an outlet line 28 extending upwardly and into the sink interior 14.

As shown in FIG. 1, a rigid exterior filter housing generally designated 30 is shown to be affixed to and supported by the rear wall 16 of the sink unit 12. The housing 30 receives and positions a pair of filter assemblies generally designated 31 (FIGS. 2–4). The filter housing 30 includes front and rear cover panels 32, 34. A solvent outlet spigot 36, and a flexible hose 38 terminating in a fountain brush unit 40 extend outwardly of the housing 30. According to this form of the invention, fluid is taken from the interior 24 of the drum or like reservoir 22 and pumped through the conduit 28, into and through filter assemblies 31 in the housing 30. Thereafter the clean solvent is directed by the user through one or both of the spigot 36, or hose 38 and brush 40 onto parts or other elements to be washed in the sink 12.

Solvent having passed through the filters 31 and housing and having served to wash the parts, passes through the drain opening 18 and back into the drum 22 from which it is recirculated as long as the pump operates. The motor for the pump 26 is controlled by a switch or the like (not shown in detail). The safety cover may be supported by a fusible link arrangement of the type shown in U.S. Pat. No. 3,522,814, for example.

Referring now to FIGS. 2–5, it is shown that the interior of the housing 30 accommodates a core unit whose elements are collectively designated 42. Left and right hand, similar but not identical filter assemblies 44, 46 form a part of the core. As shown in FIG. 3, the principal elements of the core unit 42 positioned between the front and rear cover panels 32, 34, making up the housing 30, include the filter assemblies 44, 46, a pair of opposed filter assembly support shells 48, 50, arranged in back-to-back opposed relation and a manifold assembly generally designated 52.

Each of the filter assemblies 44, 46 includes plural, liquid-tight fittings generally designated 54a, 54b, and so on, adapted to facilitate ready connection and removal of parts of the filter assemblies 44, 46 respectively with each other and with the manifold 52. Two identical locking clips 56, 58 are provided to facilitate securing and retaining the fittings in removable, liquid-tight relation to the manifold, as will appear.

As shown, each of the shells 48, 50 includes an opening 60, 62 for passage of the fittings 54a, 54b, etc., and each shell also has two or more smaller, circular openings 64, 66 through which the fittings pass 54a, 54b, etc. for attachment to the manifold 52.

Referring now to FIGS. 3–7, for example, some further details of the filter units 44, 46 are shown, as are details of the manifold generally designated 52. Referring to FIG. 6, for example, the manifold for directing liquid flow is shown to include lower, intermediate and upper tapped openings 68, 70, 72 extending into the front face 74 of the manifold 52. One sidewall 76 of the manifold includes smooth-bore lower and intermediate openings 78, 80 communicating with various interior passages in the manifold 52. The manifold 52 also includes an upper opening 82 in the sidewall opposite the sidewall 76, as well as an opening 83 disposed opposite the center Opening S0. The manifold further includes relieved or sunken faces such as the face 84 to accommodate the vertically slidable retainer clips 56, 58 having plural, substantially identical, keyhole shaped openings 86, 88. Relieved shoulders 90 provide slots 91 for slidably retaining the clips 86 adjacent the relieved or sunken faces 84 of the manifold 52. Because of the bent-in end sections 92, 94 on each of the clips 56, 58, vertical movement of the clips is limited.

Referring now in particular to FIGS. 8–9a, the basic structure and principles of operation of filter assemblies 44, 46 are shown. Here, it is shown that, when in use and filled with solvent, a typical filter assembly 44 includes a bag generally designated 99a formed by opposed, impermeable sidewalls 100, 102, joined by heat sealing to form an edge along an edge seam 104. A filter element generally designated 106 is shown to comprise opposed sidewalls 108, 110 made from a sheet of filter fabric, which is preferably a fine mesh, non-woven plastic material. The fabric is preferably seamed along its edges to form one or more sleeves generally designated 111. The filter fabric is preferably made from a heat sealable material, such that each portion of the sleeve 111 can be formed by heat sealing outer margins of the two opposed walls 108, 110 together to form seams 112, 114. The seam pattern is preferably selected so that a serpentine pattern formed from two facing sheets of fabric, as shown in FIGS. 8, 9, and 9a.

As a consequence, the filter element 106 divides the interior of the filter assembly 44 into a continuous but serpentine inner passage-forming space 116 and an outer space 118. The inner space or passage 116 directs any fluid that has not passed through the filter walls 108, 110, but which is still being urged by the force of the pump, axially along and through the passage comprising the inner space 116. The inner space or passage 116 may be considered an inner chamber, while the outer space 118 may be thought of as an outer chamber, with the two spaces or chambers 116, 118 respectively accommodating unfiltered and filtered solvent.

A consequence of the force necessary to move solvent axially of the filter is that some of the solvent will flow from the interior passage space 116 to the outer space 118, thus passing through the filter fabric and being cleaned. Consequently, in use, each filter assembly has solvent in both the inner and outer spaces 116, 118, with the outer spaces having fully filtered solvent, and the inner space solvent which may, by reason of settling and containment entrapment, be cleaner than solvent in the supply conduit, but not as clean as that in the outer space or chamber 118.

Referring now to FIGS. 5, 9 and 9a, it is shown that, in each of the filter assemblies 44, 46, the filter fabric walls 108, 110 are seamed in areas 112, 114 such that the filter fabric is formed into a serpentine passage arrangement that has an effective length greater than that of the bag sidewalls 100. The serpentine arrangement includes a lowermost passage shown extending from the area of the fitting 54a at the front of the unit 44 towards the rear of the bag, then back towards the front of the bag as shown by the directional arrows, whence the flow direction is again reversed and the fluid is directed towards the upper fitting 54b at the rear of the bag.

As is shown somewhat schematically in FIGS. 3 and 5, in one preferred form of multi-component unit, two filter assemblies 44, 46 are arranged for series/parallel flow of solvent. Thus, solvent entering the lower passage or port opening 68 of the manifold 52 passes out a lower side opening 78 and through the fitting 54a into the interior of the elongated inner chamber or passage formed by heat sealing opposed walls 108, 110 of filter fabric together. Thus, the center opening in the fitting 54a communicates with an inner space such as the space 116 in FIG. 9, defining one flow path for unfiltered liquid. After liquid has passed as shown by the directional arrows ultimately, towards the rear of the unit 44, a significant part of the liquid may remain in this inner space 116, while the remaining portion of the liquid has passed through the filter fabric sidewalls and into the outer space 118. Consequently, in the preferred form of filter, a second fitting 54c is provided at the rear end of the filter assembly 44.

The upper fitting 54b registers with and passes still unfiltered solvent through a counterpart fitting 54d on the other filter assembly 46, with the opening in the fitting 54d communicating with another inner space 116a defined by opposed sheets 108a, 110a of filter fabric/heat sealed at their margins to form the counterpart inner passage or space 116a. Hence, all of the unfiltered liquid passing into the bag 99b forming the outer part of the second filter assembly 46 continues along the path shown by the arrows in FIG. 5 until it emerges at the fitting 54e shown at the upper right of filter bag 99b. From here, it may pass through the opening 82 in the manifold and out the passage 72 in the front face 74 of the manifold 52.

According to the invention, the solvent emerging from this opening or passage 72 is somewhat cleaner than the solvent that entered, inasmuch as a certain amount of the dirt and the like entrained in the solvent has settled out and/or is retained in the interstices or on the inner surface of the filter fabric. However, solvent emerging from the passage 72 is not per se filtered, because it has not actually passed through any of the filter fabric.

Referring again to the filter unit 44, that portion of the solvent which has passed through the filter fabric and lies in the outer space 118 of bag 99a is cleaned and may take one of two paths. For example, it may pass through the opening in the upper forward fitting 54f, through the passage 80 in the manifold sidewall 76, and thence out of the opening or passage 70 in the front face 74 of the manifold 52.

Liquid that has passed through the filter and into space 118 but remains in the bag 99a near the remote end of the filter assembly 44 may pass through fitting 54c and into and through the passage in the oppositely directed fitting 54g, where it remains in the outer space 118, ultimately moving toward the front of the filter and passing into the portion of the outer space 118 adjacent the fitting 54h. From here, the solvent passes into the manifold through an opening communicating with the port 70, thus mingling with solvent that has passed through the fitting 54f. In the above description, it will be apparent that, for purposes of avoiding liquid leaks, the various fittings 54a, b, etc. are registered with counterpart fittings or with a passage in the manifold 52.

In one preferred form of parts washer, such as that shown in FIGS. 1, 3, and 5, the streams of filtered and unfiltered solvent are combined with each other before leaving the manifold 52. Thus, sufficient passages are formed in the interior of the manifold 52, as by drilling passages and blocking them with plug 77, so that unfiltered solvent flowing through fitting 54e into the passage 82 will emerge from the port 70; such flow is combined through internal passages within the manifold block 52 with the flow of filtered solvent passing through fittings 54f and 54h flowing into and through passages 80, 83, respectively. Such combined solvent streams may also flow upwardly and out of the port or passage 72.

On the other hand, it is possible to drill the passages within the manifold 52 such that there is segregation of the filtered and unfiltered flow streams and a maintenance of these streams in their respective areas until the streams flow out of their respectively assigned ports in the manifold.

Preferably, the streams are combined and the degree to which the filter is filled or "blinded" by impurities in the liquid, and hence the need for a filter change, is determined by the overall flow rate. In one case, a liquid flow capacity of 1.75 gallons per minute is provided by the pump. This rate will continue to be provided for some time, but, by reason of the flow restrictor or flow control orifice 155 in the outlet fitting 54e, when the filter has been almost completely filled or plugged and liquid flow is virtually entirely in the bypass mode, the net flow will be reduced to approximately 1.25 gallons per minute. This will be a visible difference which may be gauged by observing the length of stream emerging from the hose when the discharge nozzle is placed horizontally, or otherwise. At any rate, when this degree of flow diminution has occurred, a change of filter is indicated.

The parts washer can still retain the ability to control fluid flow so as to cause it to emerge from either the spigot or the fountain brush. For this purpose, FIG. 3 shows a manually operable control valve 39 that controls flow of liquid the hose 38.

An important feature of the embodiment of the present invention just described is its ready serviceability. Accordingly, one of the features of construction of the embodiment shown in FIGS. 2–9 is that the filter assemblies 44, 46 are able to be readily affixed to and removed from each other and to and from the manifold in a simple, rapid and relatively fool-proof way. For this purpose, two sorts of fittings, a typical male fitting generally designated 55, and a typical female fitting generally designated 57, are provided. The male fitting 55 is shown in detail in FIGS. 5a and 5b and includes a center passage 80 defined by a generally cylindrical sidewall center section 122, which includes a pair of axially outer grooves 124, 126, and a radially outwardly extending sealing flange 128. An axially inner portion of the fitting 55 includes a plurality of short extensions 130 separated from one another by re-entrant or notch portions 132. According to the preferred form of the invention, the outermost groove 124 is adapted to receive an O-ring 134 and the inner groove 126 forms a slot that is adapted to receive and register with the smaller diameter portion 136 of a keyhole-shaped slot 88 in the locking clip 86. The attachments to the flange 128 depend on the use and location of the fitting, as will appear.

Referring now to the female fitting 57, this unit includes a main body portion 140 having a radially outwardly extending sealing flange 142. A center opening generally designated 144 is defined in part by a circular sidewall 146, the outermost periphery of which includes a radially inwardly directed locking bead 148. In one form of fitting 57, an interior extension 150 having slots 152 therein is provided.

As shown in FIG. 5b, the fittings 55, 57 may mate with each other, with the O-ring 134 forming a snug, liquid-tight seal With the sidewall surface 146, and with the bead 148 preventing unintentional separation of the two fittings 55, 57. If the fitting 55 is inserted into an opening in the manifold, then, as shown in FIG. 7, the nose portion containing the O-ring slot 134 is inserted into one of the smooth bore openings such as the passage 80 in the manifold 52. Here, the reduced diameter portion 136 of the keyhole slot 88 fits within the groove 126, locking the fitting 55 in position within the manifold. The O-ring 134 provides a fluid-tight seal.

In FIG. 5b, the fittings are assumed to correspond to those used in a bag-to-bag connecting arrangement such as that shown in FIG. 5. Here, fittings 54b and 54d interconnect, and these fittings permit liquid flow from two inside-the-filter space, as also shown in FIG. 9. Hence, the radial sealing flange 128 is shown to have the plastic exterior sidewall film material 100a sealed to its axially outer face 101 and to have the inner face 103 of the flange 128 heat sealed to a portion of the non-woven filter element fiber such as the material 108a. An inner opening 109 is shown to be provided in the fabric for this purpose. In this embodiment, the solvent will pass from the inner or bypass area 116a inside the fabric into another inner passage 116. FIG. 5b therefore shows that the female fitting has its flange 142 sealed to the bag film 102 and the filter fabric 110.

It is also understood that, if the fitting 55 were intended to create communication only between the space 118 defined between the walls 100, 102 and the exterior of the passages 116 of the filter assembly 44, the seal would be formed only between a margin 141 of the bag sidewall 100 and the sealing flange 128 of the fitting 55. Thus, such a fitting would flow filtered solvent only.

Referring now to the manner in which the parts washer 10 is serviced by replacing the filter, an understanding of this process may be facilitated by reference to FIGS. 2–3 and 5–6.

When such a service is required, as is indicated by the color of the unfiltered solvent and, in some cases, by the relative flows of the filtered and unfiltered solvent streams, a service call is indicated.

There, the service person simply releases both clasps generally designated 150 (FIG. 2) permitting the movable front cover panel 32 to be opened. The entire core unit 42, including both filter assemblies 44, 46, the manifold 52 and its associated hardware, as well as the support shells 48, 50 are moved somewhat out of the positions they occupied with the cover panels closed.

Thereafter, the tabs 92 on the retainer clips 56, 58 are manipulated so as to raise the clips and cause the larger portions of the openings 88 to register with their associated openings in the manifold 52. This permits the fittings 54a, 54b, 54e and 54h on the two filter assemblies 44, 46 to be removed axially outwardly The two pairs of fittings 54b, 54c, 54d, 54g at the other end of the filter assemblies 44, 46 are separated by pulling the portions of the bags adjacent the fittings apart from each other.

The bags 99a, 99b forming the exterior of the filter assemblies 44, 46 are thus freed from the shells 48, 50 and the bags are able to be removed by the service person and placed in a suitable carrier for return to a qualified disposal site and/or for recycling. During the removal process, caps such as the cap 137 (FIG. 5a) may be used to close off the openings in some of the fittings 54, etc., it being understood that the pair of fittings 54b, 54d, 54c, and 54g are attached to each other in leak-proof relation, and that the caps 137 are necessary only for the male fittings 54a, 54f, 54e, 54h that register with the openings in the manifold.

Thereupon, identical new filter assemblies 44, 46 are provided as replacements and the pairs of fittings 54b, 54c, 54d, and 54g at the end of the bag adjacent the openings 60, 62 in the filter shells 48, 50 are manipulated into a liquid-tight, interfitted relation with one another.

The same procedure is followed for the fittings 54a, e, f, and h on the manifold end, with such fittings being pushed into the openings 64, 66 in the shells 48, 50, through the enlarged diameter opening portions of the clips 56, 58 and then into seated positions within the openings 78, 80, etc. in the manifold. After being pressed snugly into a fully seated relation, the clips are manipulated downwardly, causing the reduced diameter portions of the clip to engage the clip grooves in the fittings 54.

This secures the two bags in place with the bag edges being positioned within the shells. Finally, the cover panels 32 are swung towards each other and the clasps 150 are manipulated so as to lock the components into a packaged filter assembly 30. According to the inventive concept, such a filter change is simple and straightforward, and is highly compatible with periodic filter servicing, even when not accompanied by a change of solvent.

Referring now to FIG. 10, another embodiment of the invention is shown. Here, a self-contained form of filter assembly generally designated 200 is shown which is suitable for use as a separable part of a parts washer or as a part of another type of solvent circulation/cleaning system. The embodiment of FIG. 10 is shown to include a filter element generally designated 210, an exterior container generally designated 212, and an unfiltered solvent inlet fitting generally designated 214. A unfiltered solvent outlet fitting 216 and a filtered solvent outlet fitting 218 are also provided. In the form shown, the exterior container is a substantially non-flexible container including an outer sidewall portion 220, and a bottom wall 222 joined at a fluid-tight seam 224 to the sidewall 220.

A liquid-impermeable cover 226 is affixed, as by surrounding a contoured peripheral groove 228 having an elastomeric or like seal 230 with an encircling clamp 232, and operating a screw mechanism 234 so as to secure the cover 226 about a bead 236 formed at the top of the container sidewall 220. A contoured inner reinforcing container support 238 is optional and may be provided if desired.

The fittings 214–218 are similar to one another and are shown to include center openings defined by respective cylindrical sidewalls 240, 242, 244. As shown, the inner sidewall 240 of the solvent inlet communicates with the interior of a continuous filter tube 252. The filter tube 252 may be of a composite construction, i.e., it may have a core 253 extruded or otherwise formed from a porous foam material, into tube-like shape providing a continuous sidewall 254 defining therein an inner space 256 for the passage of solvent along the tube axis. Where a porous foam tube core 253 is provided, the exterior of the core 253 will be covered with a layer of non-woven fabric 255 of an appropriate mesh, such as 5 μ (nominal).

In the form shown, the solvent will pass vertically down the center leg of the tube 252 and thereafter undergo a series of spiral turns or convolutions until reaching a remote end 258 of the tube 252 whereat the tube is affixed in fluid-tight relation to the outlet fitting 218.

The space 260 exterior to the tube 252 is also shown to be filled with solvent or like fluid which has passed from the inner space 256 in the tube 252 and through the filter sidewalls 254 of the actual filter fabric 255. Hence, in the form of filter assembly 200 shown in FIG. 10, some of the dirty solvent or like liquid passing into the inner space 256 defined by the sidewalls 254 of the tube 252 eventually emerges as unfiltered solvent through the outlet fitting 216, while the remainder of the solvent has passed through the filter and will accumulate in the interior 260 of the pail or bucket. Once a suitable level is reached, such liquid will begin to flow up the sidewall 244 and out the outlet of the fitting 218. The liquid passing through the tube interior 256 will be somewhat clarified by reason of particle sedimentation and entrapment, but is unfiltered. The outputs from the respective fittings maybe combined or kept separate as desired.

Regarding the servicing of this embodiment, this is easily accomplished by loosening the fastener 234 and removing the ring clamp. Thereupon, the cover is lifted, carrying with it the entire extent of the tube 252. If this is done carefully, whatever solvent remains in the tubes will pass through the sidewall 254 of the tubes and into the bucket or other type exterior container. The servicing agency may then simply place another cover assembly, complete with fittings and tubes into position, secure it over the container and the unit will be suitable for subsequent service. Naturally, it is considered within the province of those skilled in the art to provide simple and straightforward means for separating the tube from the fittings if this is desirable. Any suitable arrangement of connection between the tubes and the fittings may be made that will serve the purposes of convenience, ready interchangeability, and low cost.

In the form of embodiment illustrated in FIG. 10, it will be noted that the cumulative volume of the tube relative to the volume of the container interior as a whole is somewhat small. This form of product was shown for clarity of illustration, it being assumed that, as a practical matter, the tubes might well be of comparatively larger diameter and be arranged for a much more complete filling of the container. Such design variations are considered to be within the abilities of one skilled in the art.

Referring now to FIGS. 11 and 12, another form of filter unit generally designated 300 is shown. Here, the alternate form of filter assembly is shown to comprise a generally disc-like structure having a convoluted inner section serving as the filter element. Thus, referring to FIG. 11, the filter assembly 300 is shown to include an outer shell or housing generally designated 312 in the form of top and bottom cover elements 314, 316, arranged with their inner margins 318, 320 forming flanges that are positioned in abutting relation to define a center opening generally designated 321 therein. A fastener assembly generally designated 324 and shown to include a center stud 326, a wing nut 328 and an enlarged head portion 330 are arranged to hold the flanged inner margins together. The outer margins of the cover elements 314, 316 are also formed into axially extending flanges 332, 334 that nest with each other. These flanges 332, 334 are able to be engaged by a circumferential clamp unit 336 which urges the flanges 332, 334 together to insure that the housing is snugly sealed and liquid-tight. An inner filter assembly generally designated 338 and shown in plan in FIG. 12 is intended for use within the housing formed by the elements 314, 316. This filter assembly 338 is formed in a manner generally analogous to that of the filter elements 99a, 99b shown in FIG. 9. Thus, a serpentine or convoluted passage is formed by heat sealing opposed sheets of porous filter material to each other in a desired pattern to form a filter element. Here, a continuous heat seal seam 340 is shown to extend around the entire outer periphery and also in an area from the center of the unit outwardly in a spiral pattern. When viewed in section, the heat seal areas or seams 340 are shown to divide opposed sheets 342, 344 of filter material into a single, continuous inner space or passage 346. An unfiltered liquid outlet fitting 348 is provided to permit fluid within the passage 346 to pass to the outside of the filter, and another fitting 350 is provided to permit fluid flow into the opposite end of the serpentine space or spiral passage 346.

The exterior space or chamber for filtered liquid is shown to lie outside the areas 346 between the walls 342, 344 of the filter element, but inside a plastic bag type enclosure generally designated 360 and shown to include opposed facing layers 362, 364 of a plastic sheet material. While the bag enclosure may be formed by heat sealing or using adhesives to join inner and outer margins together, leaving the filter element free inside the bag with the proper selection of material, an outer heat seal margin can serve to attach both sheets of filter medium to each other and also serve to secure them to the sheets of impermeable film forming the bag. Consequently, a filter element having a single passage of convolute form and enclosed within a donut-like exterior bag or like container can be made. In this embodiment, the rigid covers provide for protection and structural integrity more than fluid retention and, when these units are separated, the entire inner workings of the filter may be removed and discarded as a unit. In such case, suitable connections are made between margins of the fittings and the film and the filter element material, respectively. In such cases, the fittings extend through openings in, but are not permanently secured to the upper cover plate 314. Other forms of apparatus embodying the same principle will be able to be made by those skilled in the art.

As in the other embodiments, fluid passing through the walls 342, 344 will collect in the chamber 352 from which the solvent or other liquid may exit from the filter assembly 300 by passing through the fitting 354. It will be noted that, in operational principles of this embodiment of the invention are the same as those of the filters described earlier. The principal difference is only that the flow pattern is slightly different and the manner of gaining access to the filter and sealing the outside of it are different.

FIGS. 11 and 12 show a filter assembly disposed within a disc-like outer housing, showing one solvent entrance and two solvent exits from the housing. For this purpose, fittings similar to those shown and described elsewhere in the specification are illustrated.

However, it will be appreciated that the disc-like form of filter assembly comprising the exterior bag and the inner, spiral shaped passaged may be arranged for use in modular form. Thus, with a suitable arrangement of fittings, it is possible to create an array or vertically stacked arrangement of such filters that may be positioned within a drum or pale-style container, including a container such as that shown in FIG. 10. In this instance, a tube or hose may communicate with a fitting forming an inlet passage in one filter assembly. That assembly would have an outlet fitting for both filtered and unfiltered solvents in an upward-facing relation. The next or superimposed module would have an unfiltered inlet fitting in its lower surface and adapted to register with the unfiltered outlet of the lower filter, with the filtered solvent being passed between successive exterior chambers by passage through an upwardly directed fitting in an lower assembly in registry with a downwardly directed fitting in the upper module. Thus, each bag or outer container would have extending therefrom or there into fittings suitable to couple the units to one another. At the ultimate outlet, there would be an outlet for filtered liquid as well as one for unfiltered liquid. Such an arrangement would be used with an array of filter assemblies used in series.

Needless to say, such filters could also be used in a parallel arrangement, differing in that there would be plural outlets for both filtered and unfiltered solvent.

Referring now to FIG. 13, a schematic representation of a solvent circulation system generally designated 400 is shown. Here, it is shown that a tube, hose, or the like may be used in a method step generally designated 402 wherein dirty solvent is directed to the filter apparatus. As shown in block 404, all such solvent is directed to the interior of a filter sleeve. Here, the solvent follows one of two paths, illustrated by the blocks 406, 408, respectively. Block 406 shows that certain of the solvent is retained within the interior of the sleeve, tube, or other inner space, and remains therein for the time in question. Solvent which passes through the filter medium is filtered by the sleeve and is schematically shown in block 408. The output of the filtered solvent area may be directed to an area schematically illustrated as 410, namely, an end use area. Block 412 shows that solvent being processed by the apparatus will be at least somewhat clarified by entrapment of particulates in the filter medium itself, by settling, and other passive action. Such treated, but unfiltered solvent may pass through line 414 into a direct end use area 410. In the alternative, as shown by line 416, this treated but unfiltered solvent may be combined with solvent from the exterior space, i.e., with filtered solvent passing through line 420. Although not shown in FIG. 13, it will be understood that solvent having been filtered or having been treated by settling only, may be passed through another filter assembly so as to continue to be treated.

Referring now to FIG. 14, another embodiment of the invention is shown. Here, a modified form of parts washer generally designated 510 is shown. In FIG. 14, an area generally designated 524 is representative of a sump or an area below the level of a bottom wall 517 that includes a drain unit 518. As shown, a pump and motor assembly generally designated 526 is shown as a part of the solvent circulation system.

In particular, a rigid conduit 529 is shown extending downwardly from a fixture 531 on a rear wall 516 of a sink assembly generally designated 512. Electrical wires 519 are shown to be provided within the conduit 529, which also serves as a support for the pump and motor 526. A flexible solvent supply 528 extends from the outlet of the pump into a manifold (not shown in detail) positioned within the exterior housing 530 in which the filter assembly of the invention is shown.

In this embodiment, a separate handle 533 is provided to manipulate a valve-controlling solvent flow within the hose 538 serving the fountain brush 540. The spigot nozzle 537 lies at the end of a curved spigot 536 which is attached to another portion of the manifold. According to the invention, the housing 530 may be secured to the back wall 516 of the parts washer by any suitable means, such as by magnets, bolts, screws, or other fasteners.

According to the inventive concept, the housing 530 includes front and rear elements 532, 534 which are held together by clasp units 550. The exterior housing operates, and is serviced, in the same way as its counterpart shown in FIGS. 2 and 4. One of the features of the form of apparatus shown in FIG. 14 is that an existing tank type parts washer may be readily modified by providing a complete solvent circulation system, as well as a filtration system of the invention, simply by adding the pump and motor, support, and solvent flow elements together with the filter assembly as shown to an existing tank type parts washer. This converts a static or dip type parts washer into one capable of providing a solvent cleaning and servicing capability at minimal cost. If the modifications are supplied as a part of a service contract or operation, the service organization may simply reclaim the solvent handling and filtration portion of the apparatus if the services are no longer required.

Referring now to another aspect of the invention, reference is made to FIGS. 9b–9d. Here, and referring again to the earlier description, FIG. 9b shows that sidewalls 108, 110 of two opposed sheets of filter material are seamed along edges 112, 114 to provide what is in effect a tube having an interior space 116.

In this embodiment, which has proven effective, the entire thickness of the material 108, 110 is made from a material that itself has a filter incapacity. In this instance, one form of non-woven plastic filter material has an effective filter fineness or mesh of about 5 microns (5 μ) nominal size. This mesh has proved suitable for parts washer use. Other sizes somewhat larger or smaller may be used, with 5 microns being normally considered the finest mesh filter that is practical in view of the need of the user. Finer mesh filters tend to become clogged, filled or "blinded" too rapidly for practical use if their mesh size is smaller than this. From 5 to 20 microns provides very effective filtration, although larger mesh sizes may be used for other applications.

In the form of filter element shown in FIG. 9b, it is assumed that hydrostatic pressure within the center passage 116 is sufficient to form the filter into a somewhat rounded shape, as shown there, and in FIGS. 9 and 9a. However, in the form of apparatus illustrated in FIG. 10, another form of filter element may be provided. Here, a central center passage 116c is provided within an extruded shape 117 which is made from a foam or like material surrounded on its outer surface by sheets of filter medium 108c, 110c.

The foam section shown here serves two purposes. First, it provides a shape which is more self-sustaining and does not require pressure for assumption of that shape Second, a major part of the wall thickness is made from this material and not from the non-woven filter fabric 108c, 110c per se. In use, as illustrated in FIG. 9d, the provision of a foam or like core can have the advantage of providing a flow "slowdown" or stagnation zone which can encourage settling out or sedimentation of particles which are not per se trapped within the filter interstices.

Accordingly, a foam layer such as the layer 117 or the like can itself, on its surface or within its interior, entrap particles which will not serve to clog or blind the filter medium such as the medium making up the exterior sleeve 108d, 108e. This can therefore provide some cleaning action without actual filtration of the solvent.

Referring now to maintenance of filter shape, as has been discussed, and particularly, the expanded or rounded shape of the passage 116a, such a shape is assumed because of resistance to flow through the sidewalls 108, 110 (FIG. 9a) of the filter. This effect is supplemented in most cases by insuring that there is a natural bias against flow of solvent through the center passage on its way to the exterior of the filter.

Although an object of the invention to provide free flow bypass, i.e., bypassing the filter, it is usually desired to provide at least some resistance to this flow, so as to balance the pressure forces at at work during operation of the unit. For this purpose, and referring now to FIG. 5a, a flow restrictor insert unit generally designated 151 and shown to be in the form of a disc having a peripheral surface 153 and a reduced size center opening 155 is provided. When this flow restrictor disc is pressed into one of the fittings, such as the fitting 54e (FIG. 5), it will be seen to provide a flow obstruction that raises the static pressure within the passage interior. The flow restrictor may also take the form of a plug or the like.

Several embodiments of the invention having been described by way of example, it is anticipated that numerous variations and changes to the described form of apparatus may occur to those skilled in the art and it is anticipated that such modifications and changes may be made without departing from the spirit of the invention or the scope of the appended claims.

We claim:

1. A method of treating solvent used in a cleaning operation, said method comprising continuously passing a supply of solvent through a filtration apparatus which includes a fluid-impermeable exterior container and a filter element having a principal portion received within said container, and inlet and outlet end portions communicating with a first region outside of said container, said filter element having walls made from a fine mesh material and defining an elongated central passage space, said exterior container also including a clear solvent outlet, said method comprising passing liquid from said inlet end of said filter element through said elongated central passage, continuously allowing a portion of said liquid to form a filtered stream passing from part of said central passage through said filter element walls and through said clean solvent outlet to a second region outside said exterior container, and continuously allowing the remainder of said liquid to form an unfiltered stream passing entirely through said central passage in said filter element and through said filter element outlet portion to said first region outside said exterior container, with the contaminants in said unfiltered stream being continuously allowed to settle out of said unfiltered stream and become entrained within said filter element.

2. A method as defined in claim 1, wherein said treating solvent is a parts washing solvent.

3. A method as defined in claim 1, wherein said filter element comprises an interior portion made from a foam and an exterior portion made from a fabric of controlled porosity.

4. A method as defined in claim 1, wherein said elongated central passage is arranged in a sinuous path so as to provide an extended settling time and a filtration area of large cross section.

5. A method as defined in claim 1, which further includes the step of directing the fluid emerging unfiltered from said outlet portion of said filter element and directing to said inlet portion of said filter element.

6. A method as defined in claim 1 which includes the further step of directing said unfiltered stream of solvent to a manifold, directing said filtered stream of solvent to said manifold, and using said manifold to combine both of said solvent streams into a single solvent stream.

* * * * *